Feb. 16, 1965  J. K. WEIGAND ETAL  3,169,634
BARN GUTTER CLEANER
Filed Nov. 25, 1957  2 Sheets-Sheet 1
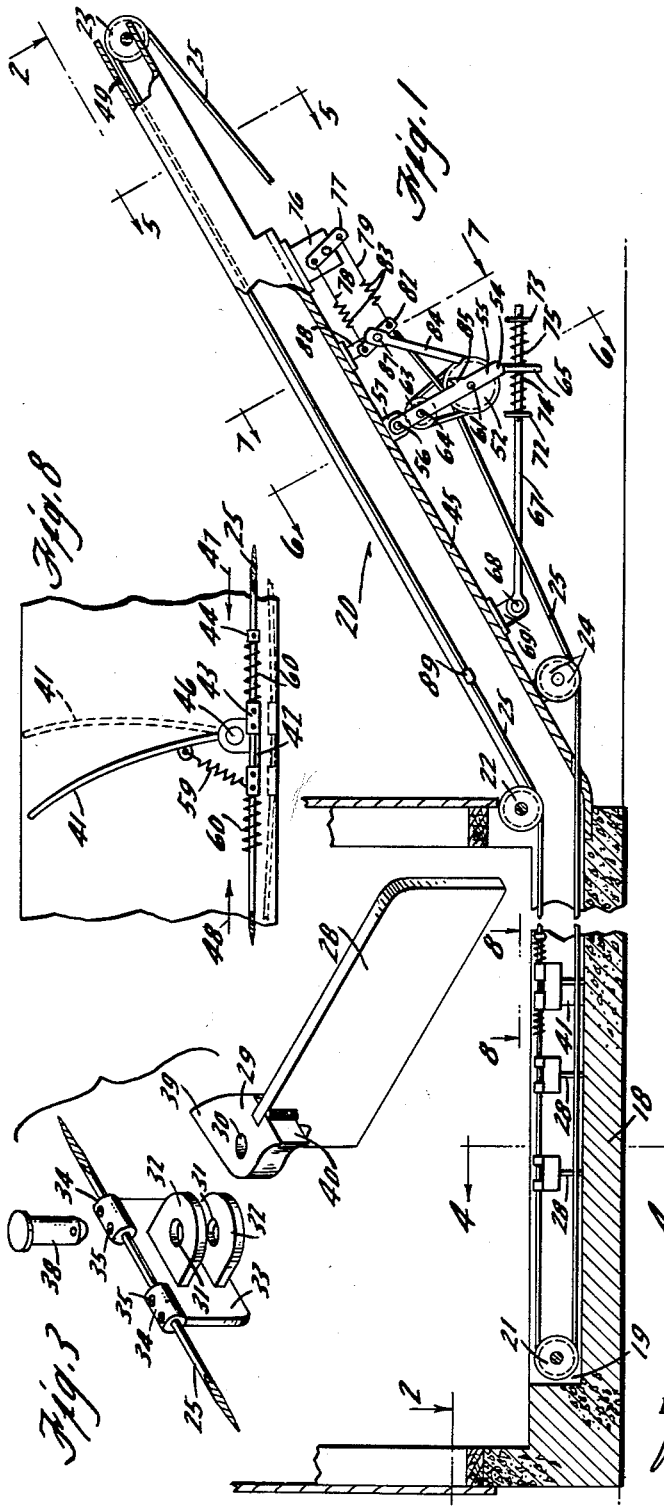
INVENTORS
JOHN K. WEIGAND
CLEONE H. WEIGAND
BY
Wheeler, Wheeler + Wheeler
ATTORNEYS Feb. 16, 1965  J. K. WEIGAND ETAL  3,169,634
BARN GUTTER CLEANER
Filed Nov. 25, 1957  2 Sheets-Sheet 2
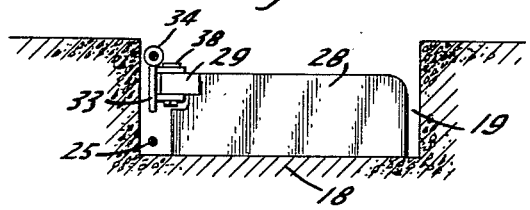
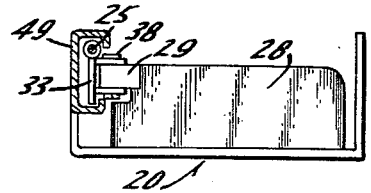
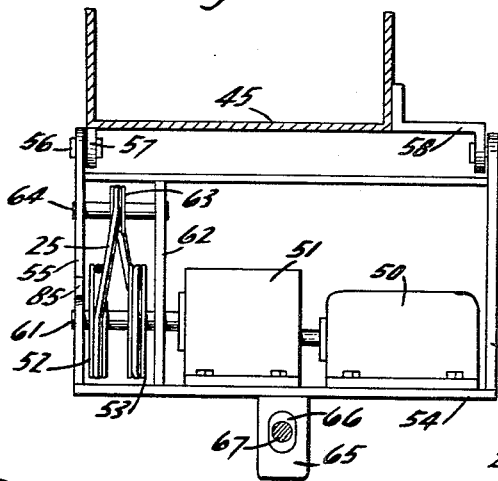
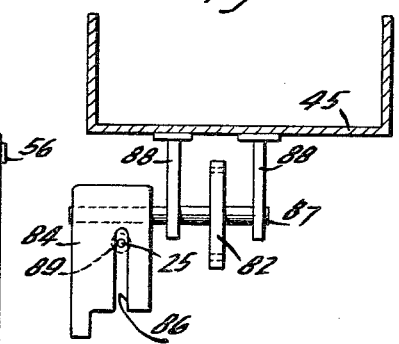
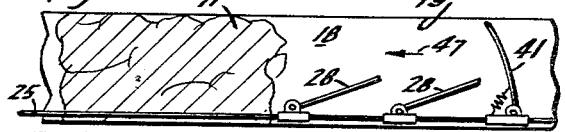
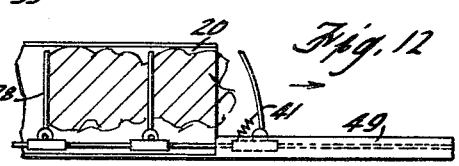
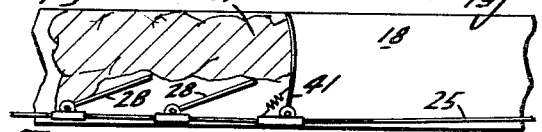
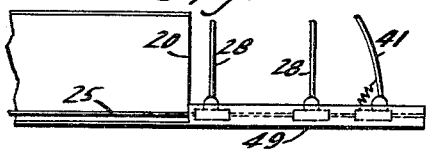
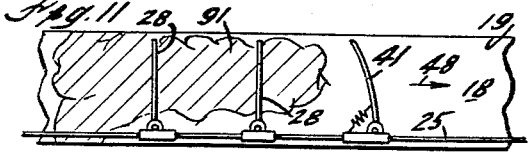
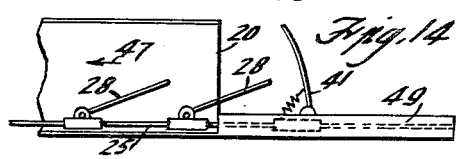
INVENTORS
JOHN K. WEIGAND
LEONE H. WEIGAND
BY
Wheeler, Wheeler & Wheeler
ATTORNEYS

United States Patent Office 3,169,634
Patented Feb. 16, 1965

3,169,634
BARN GUTTER CLEANER
John K. Weigand and Cleone H. Weigand, both of Rte. 1, Allenton, Wis., assignors of three-sevenths to Carl F. Sutherland, Madison, Wis.
Filed Nov. 25, 1957, Ser. No. 698,714
5 Claims. (Cl. 198—224)

This invention relates to a barn gutter cleaner and automatic control apparatus therefor.

The device of the present invention is an improvement on the barn gutter cleaner shown in United States Patent 2,785,790, granted March 19, 1957. The motor of the device of the prior patent aforesaid has a reversing switch by which the device is operated manually. In the device of the present invention, however, manual operation is eliminated in favor of automatic operation of a reversing switch for the motor.

In the device of the present invention a collapsed load paddle will be driven by the motor to by-pass litter which engages a sensing paddle to automatically trigger the reversing switch. The paddle will then be driven in the opposite direction to open and pick up the litter load. When the paddle reaches its discharge position, the reversing switch for the motor will again be automatically triggered to reverse the direction of movement of the paddle. Accordingly, the load paddle in the gutter will reciprocate to remove the litter from the gutter in increments. As in the device of the prior patent aforesaid litter near the discharge end of the gutter is removed first. The litter will be removed in successive increments until all litter is removed.

In the disclosed embodiment of the invention the reversing switch is actuated by the movement of the cleaner parts. In the direction of cleaner movement to discharge litter the switch is actuated by arrival of the load paddles at the end of the discharge ramp. In the opposite direction of cleaner movement engagement of the sensing paddle with the litter will jam or wedge it in the gutter to stop cleaner movement. Mechanism responsive to such cleaner stoppage will actuate the switch to again reverse the direction of cleaner movement.

Other objects, features and advantages of the invention will appear from the following disclosure of an embodiment of the invention in which:

FIGURE 1 is a view in vertical cross section through a barn gutter, discharge ramp and barn gutter cleaner embodying the present invention.

FIGURE 2 is a fragmentary plan view taken generally along the line 2—2 of FIGURE 1.

FIGURE 3 is a perspective view in spaced apart relation of a load paddle and its interconnection to the cable.

FIGURE 4 is a cross sectional view taken along the line 4—4 of FIGURE 1.

FIGURE 5 is a cross sectional view taken along the line 5—5 of FIGURE 1.

FIGURE 6 is a cross sectional view taken along the line 6—6 of FIGURE 1.

FIGURE 7 is a cross sectional view taken along the line 7—7 of FIGURE 1.

FIGURE 8 is a diagrammatic view indicating in full lines the position of the jam paddle when it is free of the gutter walls and in doted lines its position when wedged across the gutter.

FIGURES 9 through 14 are diagrammatic views indicating in sequence various positions of the cleaner in relation to the gutter, discharge ramp and litter.

As in the prior patent aforesaid the floor 18 of the barn is provided with a gutter which includes a horizontal portion 19 within the barn and an upwardly inclined portion or discharge ramp 20 outside of the barn. Suitable pulleys 21, 22, 23 and 24 are provided along the gutter for guidance of the cable 25 to which are fastened one or more load paddles or scrapers 28. The paddles 28 are slidably supported by the floor of the gutter. As best shown in FIGURE 3, the paddles 28 are provided with bearing plates 29 having bearing apertures 30 aligned in mounted position with the bearing apertures 31 of the ears 32 on the plates 33 which are connected by their eyes 34 to the cable 25 by means of set screws 35 or the like. Bearing plates 29 are pivotally interconnected to the ears 32 by pivot pins 38.

Each bearing plate 29 is provided with an end abutment portion 39 which engages the face of plate 33 when the cable is moving in the direction of arrow 48 in FIGURES 11 and 12 to hold the paddle extended across the gutter. However, the paddle may collapse when the cable moves in the direction of arrow 47, as indicated in FIGURES 9, 10 and 14, and as described in the prior patent aforesaid. Bearing plate 29 is desirably provided with an abutment 40 which will preclude complete collapse of the paddle and will hold it in its slightly open position shown in FIGURES 9, 10 and 14 to by-pass litter and pending reversal of the direction of cable movement.

While two load paddles 28 are shown, this is merely for exemplification, inasmuch as one paddle may be sufficient and more than two paddles may be provided. The advantage in fewer paddles is that the load requirements of the motor and other apparatus can be reduced.

An important feature of the present invention is the novel litter sensing paddle 41 mounted on cable 25 behind paddle 28 with reference to their movement in the direction of arrow 47. Sensing paddle 41 is slidably supported by the floor of the gutter and is pivoted to its plate 42 on pin 46. Spring 59 biases the paddle 41 to its full line position in FIGURE 8 in which it extends transversely across the gutter but is clear of contact by about two inches of the gutter side wall. When the paddle 41 engages litter, the spring 49 may yield to permit the paddle 41 to swing to its dotted line position in FIGURE 8 in which it is wedged across the gutter.

Plate 42 is provided along its upper margin with a tube 43 through which the cable 25 may freely slip. The cable, however, is provided with a knob 44 at a predetermined fixed spacing from adjacent load paddle 28. Accordingly, when the cable moves in the direction of arrow 47, the knob 44 will engage the end of tube 43 to propel the sensing paddle 41 along with the cable. When the cable moves in the direction of arrow 48, the cable can slip through the tube 43 to permit the sensing paddle 41 to move as close as possible to the adjacent load paddle 28. Alternatively the cable may be clamped to the plate 42 and have a fixed spacing from the nearest load paddle. Strain relief springs 60 may be optionally provided.

The bottom 45 of ramp 20 terminates short of its upper end, as best shown in FIGURES 2 and 12 through 14. Whereas the carrying plates 33, 42 of the respective paddles 28, 41 do not require guide means while the paddles 28, 41 rest upon the floor 18 of the gutter portion 19 and on the bottom 45 of the discharge ramp 20, a support channel 49, as best shown in FIGURE 5, is provided at the side of ramp 20 and beyond the end of ramp floor 45. The channel 49 receives the support plates 33, 42 for the paddles 28, 41 to support the paddles when they are beyond the end of the trough bottom 45. With the paddles 28 in their position along discharge ramp 20 as shown in FIGURE 13, litter load carried thereby will simply drop by gravity over the end of trough 45 into a manure spreader or the like.

Various embodiments of cable drive mechanism have worked successfully in the device of the present invention. For simplification a single drive mechanism embodiment will be described herein.

As best shown in FIGURES 1 and 6, a motor 50, gear reduction box 51, and cable drive sheaves 52, 53 are mounted on a platform 54 swingably supported on the oscillatory arms 55 from pintles 56 engaged in bracket ears 57, 58 connected to the trough bottom 45. The sheaves 52, 53 are mounted on gear box drive shaft 61 which rotates in suitable bearings in arm 55 and arm 62 spaced therefrom. The cable 25 passes about the respective sheaves 52, 53 and about an intermediate idler guide sheave 63 mounted on a jack shaft 64 also supported on arms 55, 62.

Platform 54 has a depending ear 65 having a vertically elongated aperture 66 through which extends a rod 67 which is pivotally connected on a pintle 68 to the depending ear 69 on the ramp floor 45. The rod 67 has fixed collars 72, 73 which provide seats for compression coil springs 74, 75 which bear on the ear 65 of the platform 54 to resiliently bias the platform to a neutral or centered position from which it may swing against the bias of either spring 74, 75.

The motor 50 may be provided with any suitable and conventional reversing mechanism, the conventional reversing switch 76 in FIGURE 1 being shown for exemplification. Switch 76 has an actuator arm 77 from the ends of which actuating cables 78, 79 extend to connect to the ends of another arm 82. The respective cables 78, 79 are desirably provided with strain relief coil springs 83.

Arm 82 is actuated by a lever 84 which extends toward ratchet tooth 85 on the arm 55 of platform 54. The lever 84 is also provided with a longitudinal slot 86 through which the cable 25 passes. As best shown in FIGURE 7, lever 84 is fastened to shaft 87 to which arm 82 is also fastened and which is rotatable in the bracket arms 88 which depend from the trough bottom 45.

The slot 86 in lever 84 is not wide enough to pass knob 89 which is mounted on the cable 25 at an appropriate distance from the load paddles 28 such that the knob 89 will engage the margins of the slot 86 when the paddles 28 reach their positions shown in FIGURE 13. Engagement of the knob with the lever 84 will pivot the lever 84, shaft 87 and arm 82 in a clockwise direction as viewed in FIGURE 1, whereby to correspondingly rotate the switch actuator arm 77 to actuate the reversing switch 76. In the course of this movement, lever 84 will be moved sufficiently clockwise in FIGURE 1 for its end to ride onto the ratchet tooth 85 on the arm 55 of platform 54. Spring 74 will yield slightly in the course of this movement and will bias the tooth to position under the end of lever 84. Accordingly, when the motor reverses pursuant to actuation of switch 76 and the cable 25 moves in the direction of arrow 47 to withdraw knob 89 from engagement with lever 84, the tooth 85 will hold the lever 84 in raised position and the motor will continue to drive the cable in the direction of arrow 47.

Other steps in the operation of the device will now be explained particularly in connection with FIGURES 9 through 14 which diagrammatically illustrate the various operational steps in sequence.

In FIGURE 9 the distributed litter load is indicated by reference character 91. With the cable and paddles 28, 41 moving in the direction of arrow 47, load paddles 28 are collapsed to bypass the litter 91. Sensing paddle 41, however, extends nearly across the gutter in a position to be engaged by the litter 91. If all the litter in the gutter is near its end which is most remote from the discharge ramp, there is nothing to trigger or actuate sensing lever 41 and the paddles will move along the gutter 19 until such litter as is present therein engages the sensing paddle 41 to wedge or jam it across the gutter as shown in FIGURE 10 and in dotted lines in FIGURE 8.

When the paddle 41 wedges across the gutter in response to engagement by the litter, the paddles and cable will stop. The load imposed on the cable by the jammed paddle is greater than the bias of spring 74, which will yield as the motor continues to wind the cable on the sheaves 52, 53. This will result in the platform 54 "walking" or swinging in a clockwise direction as viewed in FIGURE 1 and against the bias of spring 74.

As soon as the platform oscillates clockwise through an arc sufficient to remove ratchet tooth 85 from beneath the end of the lever 84, it will be released to drop by gravity to its position shown in FIGURE 1 and the shaft 87, arm 82 and arm 77 will be concurrently turned to actuate the switch 76 and reverse the motor 50. The motor will now operate in a direction to pull the cable and paddles in the direction of arrow 48.

The presence of the litter in the gutter and the engagement of the paddles 28 with the bottom of the gutter will cause them to swing outwardly to their position shown in FIGURE 11 and as described in the prior patent aforesaid. Each paddle 28 will now carry its load of litter along the gutter 19 past the pulley 22 and up the ramp 20, as shown in FIGURES 11 and 12. When the load paddles 28 reach their extreme upper-most position on the ramp 20, they will be beyond the end of trough bottom 45, as shown in FIGURE 13, and the litter load will be dumped by gravity into a manure spreader or the like.

Because of the slip connection between the cable 25 and the tube 43 of the bracket 42 on which the sensing paddle 41 is mounted, the paddles 28 can move in FIGURE 13 almost to the extreme end of the trough 20 inasmuch as the cable 25 is free to simply slip through the tube 43.

At this point in the cycle the cable knob 89 will pick up the lever 84 to restore it onto the ratchet tooth 85 and at the same time actuate reversing switch 76 to energize the mechanism in the manner hereinbefore described to move the paddles in the direction of arrow 47, as shown in FIGURE 14. The paddles will now return to pick up another litter load responsive to engagement there by sensing paddle 41.

Accordingly, the barn gutter cleaning mechanism will reciprocate in the gutter, its stroke being dependent on actuation of the sensing paddle.

It is clear from the foregoing description that the operation of the device is entirely automatic. There is no need for the farmer to attend manually to the actuation of any reversing switch. Accordingly, the farmer may attend to other chores and the device will continue to operate in his absence, the mechanism carrying out in each of its reciprocations no more than the load for which the motor and other apparatus may be specifically designed.

What is claimed is:

1. A barn gutter cleaner comprising a load paddle in the gutter, a motor and means connecting the motor to the load paddle for moving it along the gutter, and means for reversing the direction in which said motor drives said paddle including means for sensing litter in the gutter and responsive thereto for actuating the reversing means, said means for sensing litter in the gutter comprising a jam paddle driven by the motor and disposed at an oblique angle to a wall of the gutter and displaceable therefrom under pressure of the litter to engage said wall to wedge thereagainst.

2. The device of claim 1 in which the means connecting the jam paddle to the motor includes a load transmitting member upon which the load of the wedged jam paddle is imposed, said motor reversing means being subject to said load for reversing the motor.

3. A reciprocating barn gutter cleaner comprising load paddle means and sensing paddle means in the gutter, said load paddle means being alternatively collapsed to bypass litter when the cleaner moves in one direction and extended across the gutter to pick up litter when the cleaner moves in the opposite direction, said sensing paddle means being extended into the gutter when said load paddle means is collapsed whereby to engage litter bypassed by the load paddle, a motor, means connecting said paddles to said motor and means for reversing the direction in which said motor drives said paddles along the gutter when said sensing paddle means is engaged by litter in the gutter, said sensing paddle means comprising a jam paddle and disposed at an oblique angle to a wall of the gutter and displaceable therefrom under pressure of the litter to engage said wall to wedge thereagainst, the means connecting the motor to the paddles including a load transmitting member upon which the load of the wedged jam paddle is imposed, said reversing means being subject to the load of the wedged jam paddle for reversing said motor.

4. The device of claim 3 in which said means for reversing the direction in which the motor drives said paddles comprises a switch for reversing the direction in which the motor rotates, a switch actuator and means interconnecting the switch actuator to said load transmitting member and responsive to load for actuating the actuator.

5. The device of claim 4 in which said load transmitting member comprises a cable and said means last mentioned comprises a sheave about which said cable is wound, platform means on which said sheave is mounted, said platform being subject to movement pursuant to loading the cable, and a connection between said platform means and said switch actuator for actuating the switch pursuant to movement of the platform means.

References Cited in the file of this patent
UNITED STATES PATENTS

| | | |
|---|---|---|
| 2,578,871 | Woldring | Dec. 18, 1951 |
| 2,812,055 | Wenger | Nov. 5, 1957 |
| 2,925,169 | Gerand et al. | Feb. 16, 1960 |
| 2,988,204 | Sutherland | June 13, 1961 |